United States Patent Office 3,591,415
Patented July 6, 1971

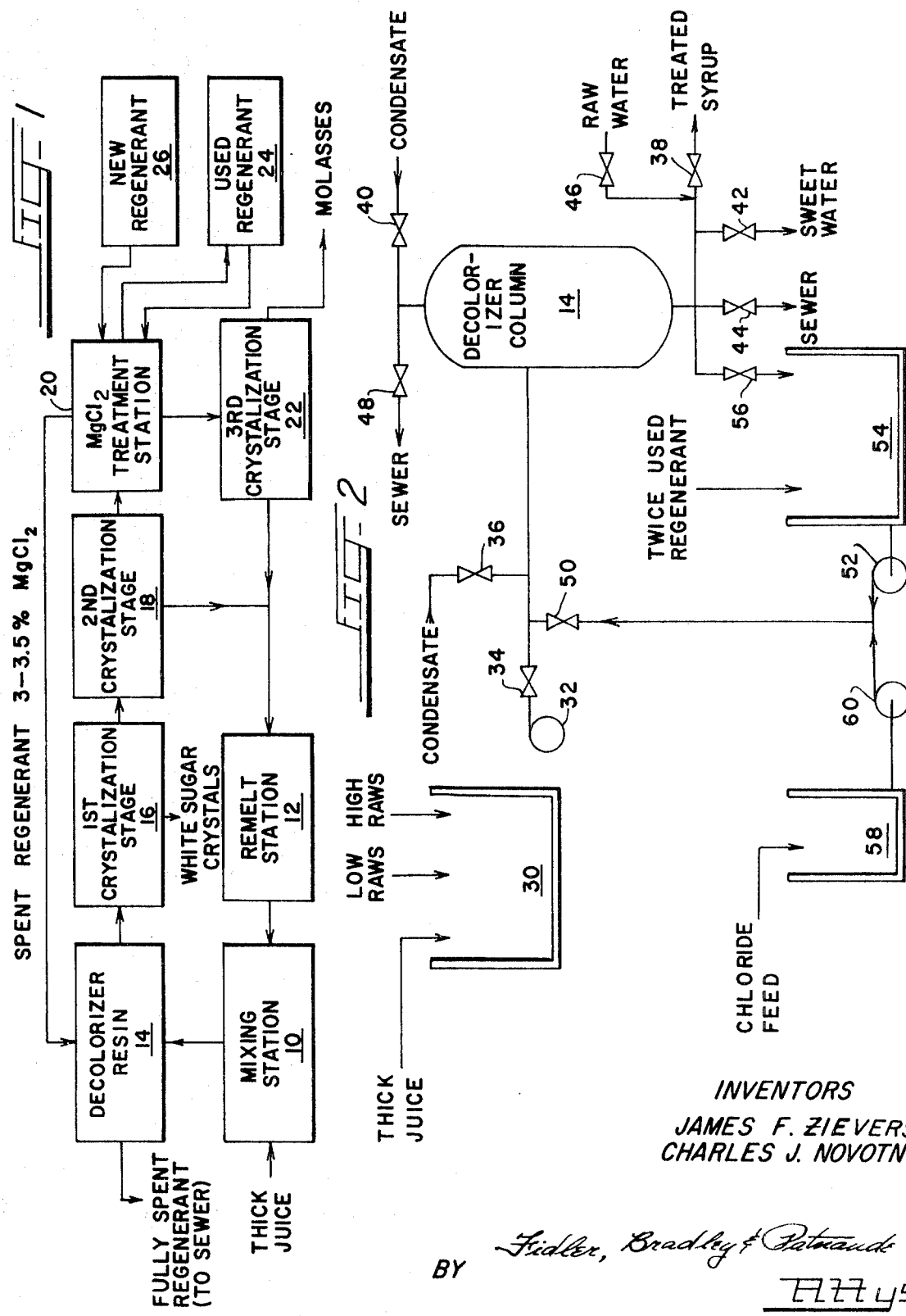

3,591,415
ION EXCHANGE REGENERATION
James F. Zievers, La Grange, and Charles J. Novotny, Hickory Hills, Ill., assignors to Industrial Filter & Pump Mfg. Co., Cicero, Ill.
Filed Mar. 18, 1968, Ser. No. 713,861
Int. Cl. C13d 3/14; C13f 1/12; B01d 41/02
U.S. Cl. 127—14                                                                  4 Claims

ABSTRACT OF THE DISCLOSURE

A magnesium cation exchange resin used for potassium removal in a sugar refining process is regenerated with a solution of magnesium chloride which is thereafter used to regenerate an ion exchange resin used as a decolorizer in the same refining process.

---

The present invention broadly relates to the regeneration of ionic exchange resins and it more particularly relates to a method and apparatus for use in regenerating a cation exchange resin and an anion exchange resin used in a sugar refining process.

Systems for extracting sugar from sugar bearing agricultural products such, for example, as sugar beets, generally employ a plurality of crystallization stages for separating the sugar from the sugar bearing juices initially obtained from the product. It has been found that the amount of sugar extracted from the product can be economically increased by removing the potassium from the messecuite prior to the final crystallization stage. This may be done passing the massecuite through a cation exchange resin in the magnesium form.

After the cation exchange resin is spent, it is normally regenerated with a solution of magnesium chloride which is generally reused once during such regeneration process. Magnesium chloride is a relatively expensive regenerant, but in accordance with the current practice, the once reused magnesium chloride solution, which has a chloride concentration of about 3 to 3.5% is discarded.

We have determined that this once reused regenerant while unsatisfactory for regenerating a magnesium cation exchange resin may be used to satisfactorily regenerate the types of anion resins which are used to decolorize the sugar bearing juices present at various stages in the overall extraction system. In fact, we have found that the amount and concentration of the once reused magnesium chloride solution normally discarded from a typical sugar beet plant is sufficient to regenerate the amount of anion resin required to decolorize the quantity of standard liquor being fed to the first crystallization stage of such a plant. Accordingly, the efficiency of a sugar extraction process can be economically improved by the addition thereto of a magnesium cation resin for potassium removal, and the quality of the sugar produced can be economically improved by the addition of an anion resin for decolorization, particularly if the twice used regenerant for the cation resin is thereafter used to regenerate the anion resin.

Therefore, an object of the present invention is to provide a new and improved system for refining sugar.

Another object of the present invention is to provide a new and improved method and system for regenerating anion exchange resins.

A further object of the present invention is to provide a new and improved method and system for regenerating a cation exchange resin and an anion exchange resin which are used in the same system.

Further objects and advantages and a better understanding of the present invention may be had by reference to the following detailed description taken in connection with the accompanying drawing, wherein.

FIG. 1 is a flow diagram of a portion of a sugar refining system embodying the present invention; and FIG. 2 is a schematic flow diagram of the resin regeneration system of the present invention as embodied in the system of FIG. 1.

Referring now to the drawings, and particularly to FIG. 1 thereof, there is shown a portion of a sugar processing system beginning with that portion of the system wherein thick juice is present. Although the manner in which the thick juice is derived from the agricultural product is not important so far as the present invention is concerned, the thick juice is generally obtained by extraction from the agricultural product, purification and filtration, carbonation, mixing with sulphur dioxide to remove some color forming material and evaporation. Accordingly, the thick juice is a highly concentrated solution of sugar including potassium, phosphates, calcium, and other materials depending upon the nature of the agricultural product and the area in which it was grown.

As illustrated in FIG. 1, the thick juice is fed to a mixing station 10 wherein it is mixed wth remelted sugar from one or more remelt stations 12 and then passed through a decolorizer in the form of an anion exchange resin to a first crystallization stage 16. The decolorizer station may consist of one or more columns each containing an anion exchange resin such as that sold by Nalco Chemical Company under the name "Dowex 11," or "Duolite" ES–111 sold by Diamond Alkali Company, or "Amberlite" exchange resin IRA–90 sold by Rohm and Haas Company.

In the first crystallization stage 16, white sugar crystals are extracted from the sugar solution. The remaining liquor, which is generally referred to as a centrifugal runoff and in some cases as the high greens, is then fed to a second crystallization stage 18. Sugar crystals of lower purity than those of the first crystallization stage 16 are extracted from the syrup in this second crystallization stage 18 and are sent to the remelt station 12 where they are remelted and mixed with the incoming thick juice at the mixing station 10. The remaining liquor, sometimes called the low greens, is then passed to a magnesium chloride treatment station 20 in the form of one or more columns of a magnesium cation exchange resin which removes a substantial amount of the potassium from the low greens syrup. Other materials such as sodium, if present, will also be removed from the syrup in the treatment station 20. The thus treated syrup from the station 20 is fed to a third crystallization stage 22 wherein the syrup is again crystallized and the sugar crystals are fed to the remelt station 12 or to a separate remelt station which, in either case, feeds the mixing station 10. That liquor which remains after the third crystallization stage 22 is final molasses.

Periodically, the magnesium cation exchange resin must be regenerated and a magnesium chloride solution is used for this purpose. In the regeneration cycle which includes the normal steps of sweetening off and rinsing, a once-used regenerant from a storage tank 24 is passed through the cation exchange resin and in the past has been then sent to the sewer. Following the partial regeneration by the once-used regenerant, new or fresh regenerant is fed from a storage tank 26 through the cation exchange resin at the station 20 and supplied to the used regenerant tank 24 where it is stored until the next regeneration cycle. Normally, the new regenerant brine has a concentration of magnesium chloride in the order of 7 to 8% and the twice used or once reused regenerant from the tank 24 which has heretofore been discarded to the sewer has a concentration of chloride of about 3½ to 4%.

These chlorides are primarily MgCl$_2$, KCl and NaCl. This chloride brine which has been wasted in the past may be fed to the anion exchange resin at the decolorizer station 14 to regenerate it during the normal regeneration cycle for the anion resin.

Referring now to FIG. 2, there is shown in greater detail a portion of the mixing station 10, the decolorizer station 14, and the system used to regenerate the anion exchange resin. As shown, the thick juice is supplied to a tank 30 where it is mixed with the syrup from the remelt station 12. If separate remelt stations are provided for melting the sugar crystals from the second and third crystallization stages, the remelted sugar solutions are generally called high raws and low raws, respectively. After mixing, the solution becomes known as standard liquor and is pumped via a pump 32 through a valve 34 to the decolorizer column 14. If desired, a condensate from another location in the system may also be fed to the decolorizer column 14 through a valve 36. After passing through the anion exchange resin, the treated syrup is fed from the bottom of the column 14 through a valve 38 to the first crystallization stage.

When the anion exchange resin becomes spent and requires regeneration, the valves 34, 36 and 38 are closed thereby disconnecting the decolorizer column 14 from the system. It will be understood that in a normal system additional decolorizer columns will be provided so that the resins in the respective columns may be periodically regenerated without interrupting the operation of the overall system. With the column 14 disconnected from the system, the valve 40 may be opened to supply condensate from elsewhere in the system to the top of the column 14 and a valve 42 connected to the bottom of the column 14 is opened. The water passing through the anion resin will pick up the sugar solution contained therein and passes through the valve 42 as sweet water which finds other application in the overall system as well as in the regeneration of the magnesium cation resin station 20. After the sugar concentration of the sweet water has decreased to an acceptably low level, the valve 42 is closed and the valve 44 is opened, whereby the condensate now passing through the resin is discarded to the sewer. When the anion resin has been sufficiently rinsed, the valves 40 and 44 are closed and the valve 46 which supplies fresh water to the bottom of the column 14 and the valve 48 which connects the top of the column 14 to the sewer are opened. The anion resin is then backwashed for a period of time depending upon the nature of the resin and the amount thereof. Upon completion of the backwashing operation, the valves 46 and 48 are closed and the valve 44 is once more opened to drain off the water from the column 14 to the sewer. With the valve 44 open, a valve 50 is opened and a pump 52 is operated to pump the regenerant which was twice used in regenerating the cation resin from a storage tank 54 to a column 14 and through the valve 44 to the sewer. As shown in FIG. 2, the regenerant which has twice passed through the MgCl$_2$ treatment station 20 is stored in the tank 54. A valve 56 is connected in a line between the bottom of the decolorizer column 14 and the tank 54 so that the twice used regenerant may be recirculated through the column 14 if desired. Although under normal operating conditions a sufficient amount of the twice used regenerant from the MgCl$_2$ station is available for regenerating the anion exchange resin in the decolorizer column 14, in order to insure that the system may continue to operate should the twice used regenerant not be available, a second storage tank 58 is provided for retaining a supply of chloride regeneration brine. This solution may be any solution of chloride as is available and would generally be sodium chloride because of its relatively low cost. A pump 60 is provided for pumping the fresh chloride brine through a valve 50 to the decolorizer column 14 should that become necessary.

An example of the manner in which the present invention finds application in a typical sugar processing system is as follows:

A beet sugar factory processing between six thousand and sixty-five hundred tons per day of sliced beets has a flow rate of between 90 and 100 gallons of intermediate greens per minute. These greens are fed to the MgCl$_2$ treatment station 20. The approximate amount of magnesium cation exchange resin required to accommodate this flow rate is 1350 cubic feet of resin and must be regenerated eight times per day. Normally the resin is contained in three columns of 450 cubic feet each and each column is regenerated once every three hours. During each such regeneration cycle, there is approximately thirty-five minutes when the twice used regenerant flows out of the respective column being regenerated. The regeneration flow rate at this time is approximately 120 gallons per minute and during the latter twenty-three minutes of this time the regenerant "runs clear" i.e., it has no color and would be suitable for regenerating the anion decolorizer resin. Therefore, there are twenty-three minutes during each three hours when the twice used regeneration brine is usable for regeneration of the anion exchange resin and since the flow rate is 120 gallons per minute there is thus 2760 gallons of the twice used brine available during each three-hour period making a total of 22,080 gallons of twice used brine available for regeneration of the anion resin per day.

This amount of regenerant having a chloride concentration of 3½ to 4% is sufficient to regenerate 490 cubic feet per day of an anion exchange resin used on a decolorizing cycle. This amount of anion resin will accommodate a flow of approximately 245 gallons per minute of 67-degree of Brix liquor for removal of 1.5 degree Horne color units and this is approximately the standard liquor flow of a sugar beet factory processing 6,000 to 6,500 tons of sliced sugar beets per day. Consequently, during normal operation of such a plant, it is unnecessary to provide any additional regenerant for the anion exchange resin thereby making it economical to include a decolorizing step between the mixing station and the first crystallization stage.

While the present invention has been described in connection with a particular embodiment thereof, it will be understood that those skilled in the art may make many changes and modifications without departing from the true spirit and scope of this invention, and accordingly, all such changes and modifications which fall within the true spirit and scope of this invention are intended to be covered in the appended claims.

We claim:

1. In a sugar refining system employing a cation exchange resin in magnesium form to remove potassium from sugar syrup, and an anion exchange resin for decolorizing a sugar syrup, the method of regenerating said cation and anion resins comprising the steps of
regenerating said cation resin by treating it with a solution of magnesium chloride, and
thereafter reusing said solution of magnesium chloride to regenerate said anion resin.

2. The method according to claim 1 wherein
said solution of magnesium chloride has a concentration in the order of 7 percent when first used to regenerate said cation resin and has a concentration of less than 3.5 percent when used to treat said anion resin.

3. Apparatus for use in a sugar refining process for extracting white sugar from a sugar syrup, comprising the combination of:
an anion exchange resin treatment column through which said syrup is passed to remove color therefrom;
a crystallization station connected to be supplied with the syrup which is passed through said anion exchange resin treatment column to separate white sugar crystals therefrom;
a magnesium cation treatment column containing a cation exchange resin in magnesium form;

means for supplying sugar syrup from said crystallization station to said magnesium cation treatment column to remove potassium therefrom;

means for feeding said syrup from which the potassium has been removed by said cation treatment column to said anion exchange resin treatment column for repassage through said crystallization station;

a storage tank for used magnesium chloride regenerant;

means for passing a magnesium chloride regenerant solution through said magnesium cation treatment column to regenerate the exchange resin therein;

a conduit for passing used magnesium chloride regenerant from said magnesium cation treatment column into said storage tank; and a conduit communicating with said storage tank and said anion exchange resin treatment column for passing the used magnesium chloride regenerant solution which has passed through said magnesium cation treatment column through said anion exchange resin treatment column to regenerate the resin therein.

4. In a sugar refining system employing a cation exchange resin in magnesium form to remove potassium from sugar syrup and an anion exchange resin for decolorizing a sugar syrup, the method of regenerating said cation and anion resins comprising the step of:

treating said anion resin and said cation resin with a solution of magnesium chloride by applying said solution of magnesium chloride first to one of said resins and then to the other in succession, whereby the same solution may be used to regenerate both resins.

References Cited

UNITED STATES PATENTS

| | | | |
|---|---|---|---|
| 2,482,765 | 9/1949 | Haagensen | 127—46 |
| 2,507,992 | 5/1950 | Payne et al. | 127—46 |
| 2,628,165 | 2/1953 | Bliss | 210—38X |
| 2,971,868 | 2/1961 | Assalini | 127—46 |

OTHER REFERENCES

Calmon et al.: "Ion Exchangers in Organic and Biochemistry" (1957), pp. 56–58.

MORRIS O. WOLK, Primary Examiner

D. G. CONLIN, Assistant Examiner

U.S. Cl. X.R.

127—9, 46; 210—34, 269